United States Patent [19]
Takagi et al.

[11] Patent Number: 5,369,800
[45] Date of Patent: Nov. 29, 1994

[54] MULTI-FREQUENCY COMMUNICATION SYSTEM WITH AN IMPROVED DIVERSITY SCHEME

[75] Inventors: Tasuku Takagi; Zenichirou Nagasawa; Toshikazu Dambayashi, all of Sendai, Japan

[73] Assignee: Small Power Communication Systems Research Laboratories Co., Ltd., Sendai, Japan

[21] Appl. No.: 885,966

[22] Filed: May 20, 1992

[30] Foreign Application Priority Data

Aug. 16, 1991 [JP] Japan .................. 3-205799

[51] Int. Cl.$^5$ .............................. H04B 7/08
[52] U.S. Cl. ...................... 455/59; 455/101; 455/135; 455/276.1
[58] Field of Search ............ 455/59, 60, 62, 63, 455/10, 101, 133, 134, 135, 272, 275, 276.1, 277.1, 277.2, 102, 103, 104; 375/100

[56] References Cited

U.S. PATENT DOCUMENTS

| | | |
|---|---|---|
| 1,940,097 | 12/1933 | Ohl et al. . |
| 2,504,341 | 4/1950 | Matthews ............... 455/135 |
| 2,955,199 | 10/1960 | Mindes et al. . |
| 3,662,268 | 5/1972 | Gans et al. ............. 455/59 |
| 4,584,716 | 4/1986 | Drentea . |
| 5,204,980 | 4/1993 | Sharples ............. 455/277.1 |

FOREIGN PATENT DOCUMENTS 869361 7/1949 Germany .
0050841 3/1983 Japan .................. 455/134

*Primary Examiner*—Reinhard J. Eisenzopf
*Assistant Examiner*—Nguyen Vo
*Attorney, Agent, or Firm*—Oblon, Spivak, McClelland, Maier, & Neustadt

[57] ABSTRACT

In a transmitting section, a modulator modulates a first carrier with data to be transmitted, thereby producing a modulated output $f_m$, a local oscillator generates a local oscillating signal to be used as a second carrier $f_{LO}$, a mixer mixes the modulated output and the local oscillating signal, thereby generating waves of different frequencies. These waves include an upper side band wave $f_{LO}+f_m$ and a lower side band wave $f_{LO}-f_m$. A transmitting antenna radiates electromagnetic waves into the air, which includes the waves of different frequencies generated by the mixer. In a receiving section, a receiving antenna receives the electromagnetic waves, a diversity section extracts at least one of the upper side band and lower side band waves $f_{LO}+f_m$, $f_{LO}-f_m$ from the waves of different frequencies received by the receiving antenna, a local oscillator generates a local oscillating signal corresponding to the second carrier, a mixer mixes the one wave extracted by the diversity section and the local oscillating signal generated by the local oscillator, thereby generating an output, and a demodulator extracts a signal corresponding to the first carrier, from the output of the mixer, and demodulates the signal thus extracted, thereby outputting data corresponding to the data transmitted from the transmitting section.

14 Claims, 7 Drawing Sheets

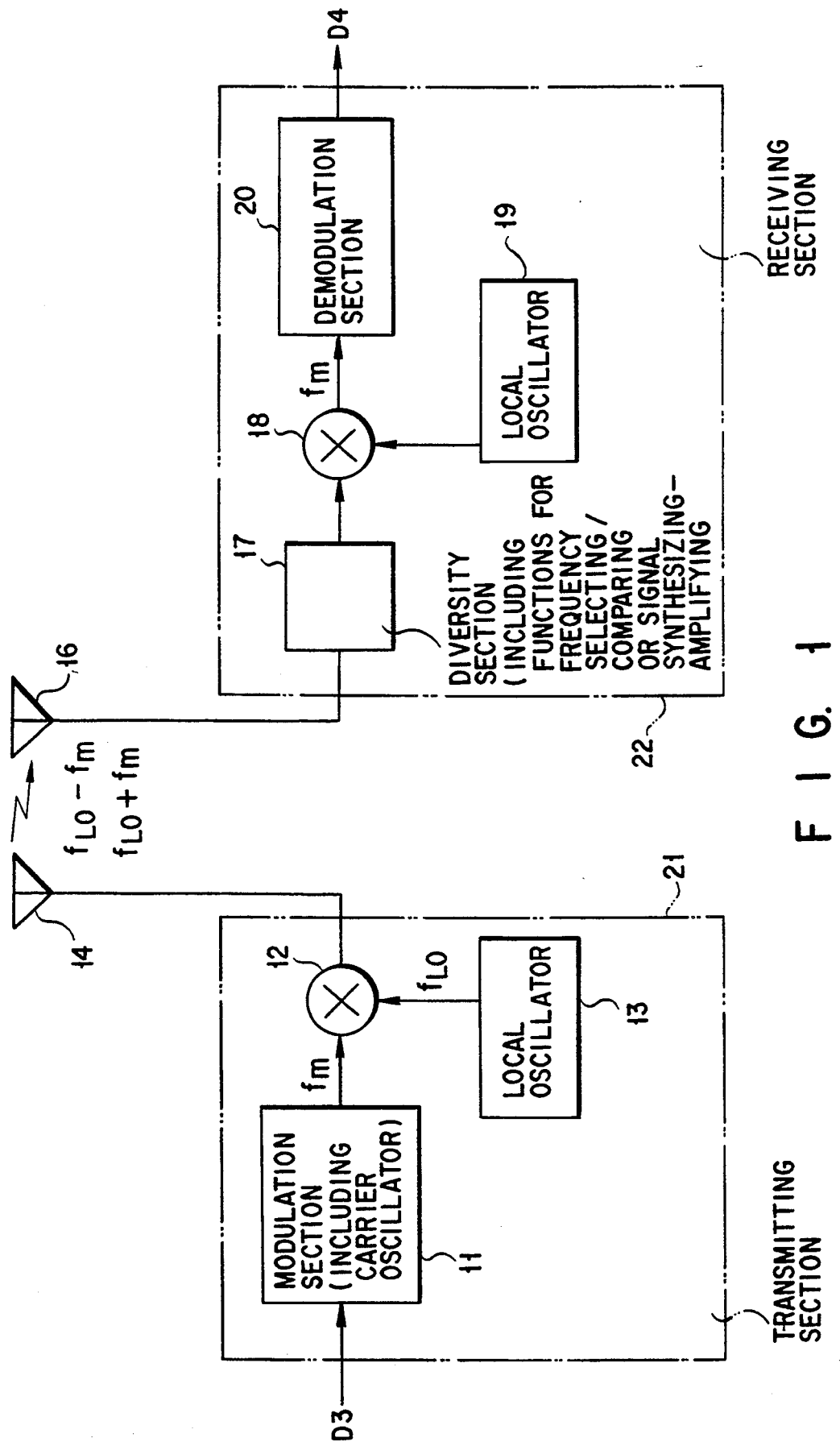
F I G. 1

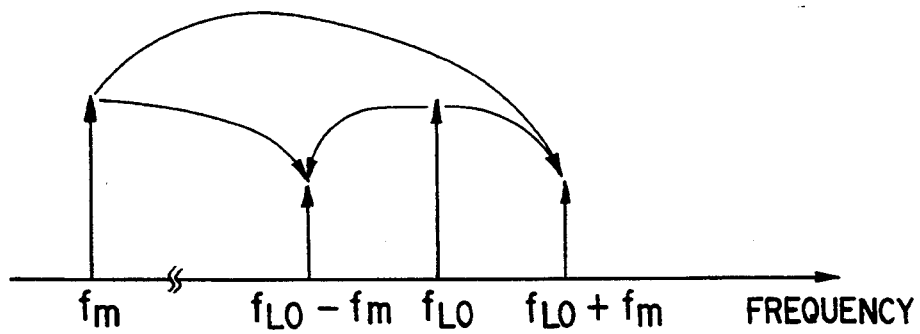
F I G. 2
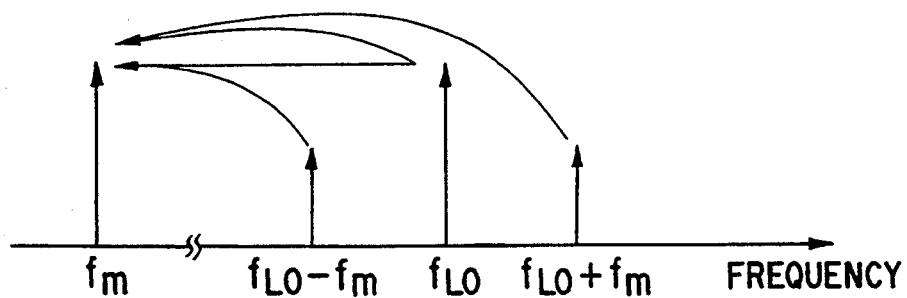
F I G. 3

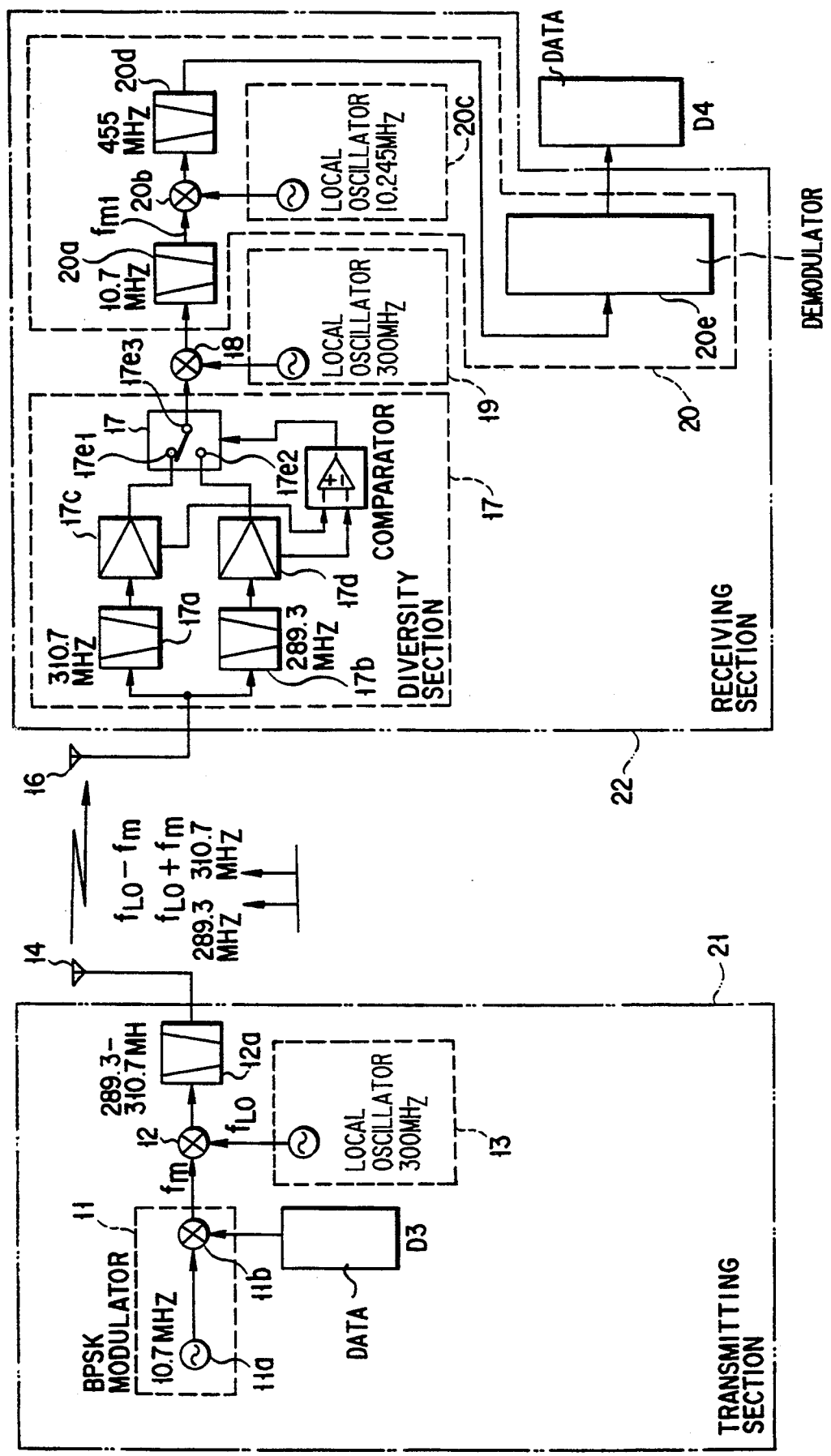
F I G. 4A

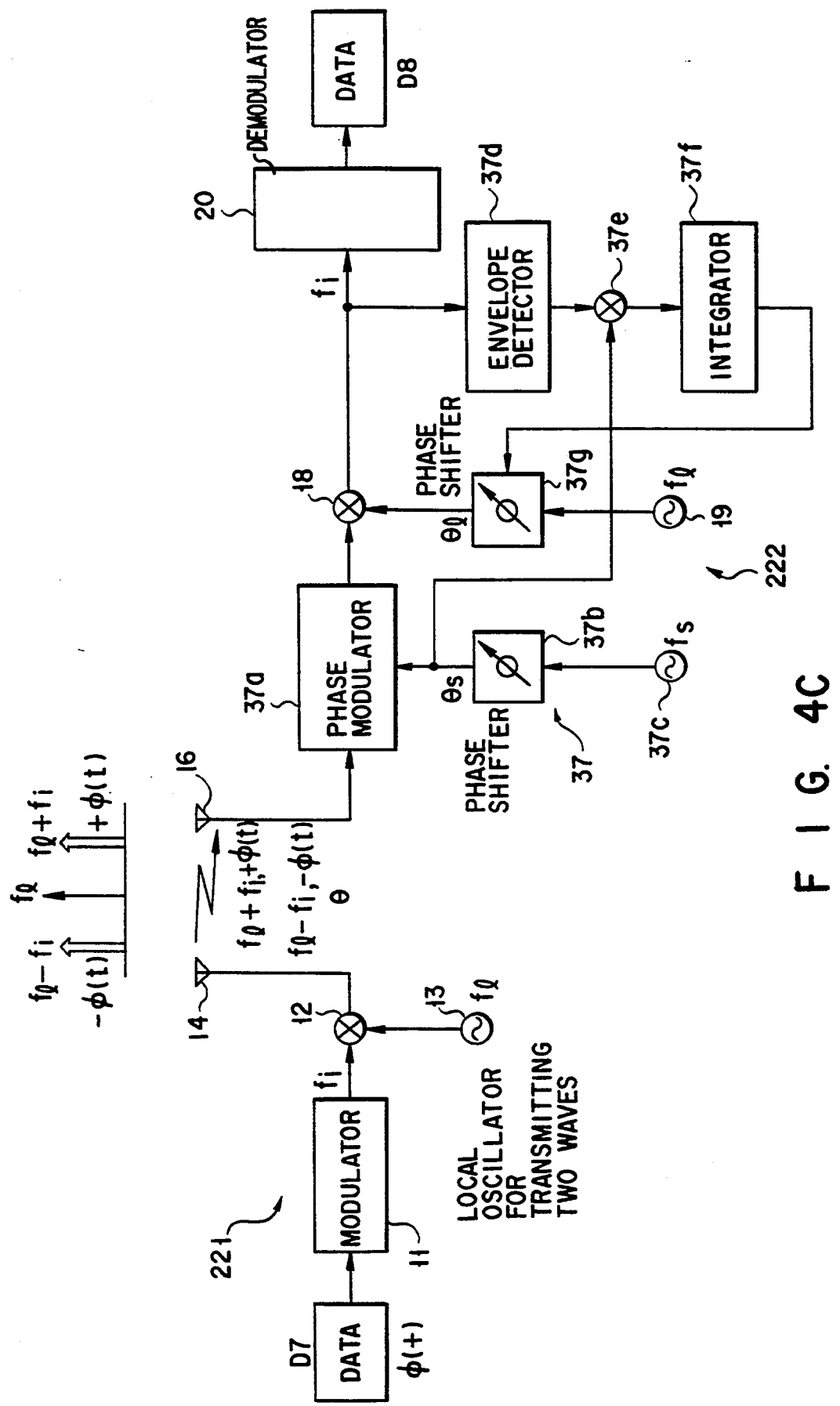
F I G. 4C

MULTI-FREQUENCY COMMUNICATION SYSTEM WITH AN IMPROVED DIVERSITY SCHEME

BACKGROUND OF THE INVENTION

1. Field of the Invention

The present invention generally relates to a communication system with a diversity scheme, and more particularly to a communication system with an improved diversity scheme which uses weak electromagnetic waves as a medium and in which a transmitting station transmits the same data on carriers having different frequencies.

2. Description of the Related Art

Generally, radio communication makes use of electromagnetic waves of a specific frequency. Such a communication system is exposed to the influence of interference waves and that of fading. There is a communication system which is free of the influence of interference waves and fading. This system has a diversity scheme, wherein the same data is transmitted on a plurality of carriers of different frequencies.

FIG. 5 is a block diagram showing a known system with a diversity scheme. This system has a transmitting station and a receiving station. In the transmitting station, data D1 is input to a first transmitting section 1 and a second transmitting section 2. The first transmitting section 1 modulates the data D1, superposing it on a first carrier. The second transmitting section 2 modulates the data D1, superposing it on a second carrier. As a result, the first and second transmitting sections 1 and 2 produce two sets of data. The two sets of data are supplied via an antenna combining equipment 3 to an antenna 4, and are transmitted therefrom in the form of two streams of electromagnetic waves. The streams of electromagnetic waves travel through the air. In the receiving station of the communication system, an antenna 6 receives the two streams of electromagnetic waves transmitted from the antenna 4 of the transmitting station. The first stream of electromagnetic waves, i.e., the data D1 superposed on the first carrier, is input to a first receiving section 7. The second stream of electromagnetic waves, i.e., the data D1 superposed on the second carrier, is input to a second receiving section 8. The first receiving section 7 demodulates the first stream of electromagnetic waves into data, whereas the second receiving section 8 demodulates the second stream of electromagnetic waves into data. The data items output by the first and second receiving sections 7 and 8 are compared in terms of their qualities, and one of data of better quality is selected by means of a changeover switch 9 and output therefrom as data D2.

As can be understood from the above, a communication system with a frequency-diversity scheme, however, needs to have a plurality of transmitting sections, a plurality of receiving sections and the antenna combining equipment.

SUMMARY OF THE INVENTION

It is, therefore, an object of the present invention to provide a new and advanced multi-frequency communication system with an improved diversity scheme, which uses carriers of different frequencies to transmit data, thereby achieving radio communication well protected against interference waves and fading, and which can simplify the construction of the transmitting section and the receiving section.

According to one aspect of the present invention, there is provided a multi-frequency communication system comprising:

a transmitting section including:
  modulation means for modulating a first carrier with data to be transmitted, thereby to generate a modulated output;
  local oscillation means for generating a local oscillating signal which is to be used as a second carrier;
  mixer means for mixing the modulated output from the modulation means and the local oscillating signal generated by the local oscillation means, thereby to generate waves of different frequencies, including at least an upper side band wave having a frequency which is a sum of the frequencies of the modulated output and the local oscillating signal and a lower side band wave having a frequency which is a difference between the frequencies of the modulated output and the local oscillating signal; and
  transmitting antenna means for radiating electromagnetic waves into the air, the electromagnetic waves including the waves of different frequencies generated by the mixer means, and a receiving section including:
  receiving antenna means for receiving the electromagnetic waves including the waves of different frequencies radiated from the transmitting antenna means;
  diversity means for extracting at least one wave of the upper side band wave and the lower side wave from the waves of different frequencies received by the receiving antenna means;
  local oscillation means for generating a local oscillating signal which corresponds to the second carrier;
  mixer means for mixing the one wave extracted by said diversity means and the local oscillating signal generated by the local oscillation means, thereby to generate an output; and
  demodulation means for extracting a signal corresponding to the first carrier, from the output generated by the mixer means, and for demodulating the signal thus extracted, thereby to output data corresponding to the data transmitted from the transmitting section.

According to another aspect of this invention, there is provided a method of performing multi-frequency communication, comprising the steps of:
  modulating data, thereby outputting a first carrier;
  generating carriers of different frequencies, thereby mixing by means of a mixer, the first carrier and a local oscillating signal from a local oscillator;
  radiating the carriers of different frequencies into the air;
  receiving the carriers of different frequencies radiated into the air;
  reproducing the first carrier with diversity, thereby mixing by means of a mixer, at least one of the carriers of different frequencies and a local oscillating signal from a local oscillator; and
  demodulating the first carrier with diversity, thereby reproducing and outputting the data.

According to still another aspect of this invention, there is provided a multi-frequency communication system comprising: a transmitting section including: modulation means for modulating a first carrier with data to be transmitted, thereby to generate a modulated output; local oscillation means for generating a local oscillating signal which is to be used as a second carrier; mixer means for mixing the modulated output from the modulation means and the local oscillating signal generated by the local oscillation means, thereby to generate waves of different frequencies, including at least an upper side band wave having a frequency which is a sum of the frequencies of the modulated output and the local oscillating signal and a lower side band wave having a frequency which is a difference between the frequencies of the modulated output and the local oscillating signal; and transmitting antenna means for radiating electromagnetic waves into the air, the electromagnetic waves including the waves of different frequencies generated by the mixer means, and a receiving section including: receiving antenna means for receiving the electromagnetic waves including the waves of different frequencies and radiated from the transmitting antenna means; diversity means for synthesizing, in phase state, at least the upper side band wave and the lower side band wave within the waves of different frequencies received by the receiving antenna means; and demodulation means for extracting a signal corresponding to the first carrier, from an output synthesized by the diversity means, and for demodulating the signal thus extracted, thereby to output data corresponding to the data transmitted from the transmitting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

FIG. 1 is a block diagram showing the basic structure of a multi-frequency communication system according to the present invention;

FIG. 2 is a diagram representing the frequency spectrum of the electromagnetic waves generated in the transmitting section of the system shown in FIG. 1;

FIG. 3 is a diagram illustrating the frequency spectrum of the electromagnetic waves generated in the receiving section of the system shown in FIG. 1;

FIG. 4A is a block diagram showing the communication system of FIG. 1 in greater detail;

FIGS. 4B and 4C are block diagrams showing modifications of the communication system of FIG. 4A;

DETAILED DESCRIPTION OF THE PREFERRED EMBODIMENTS

Figure 4B:
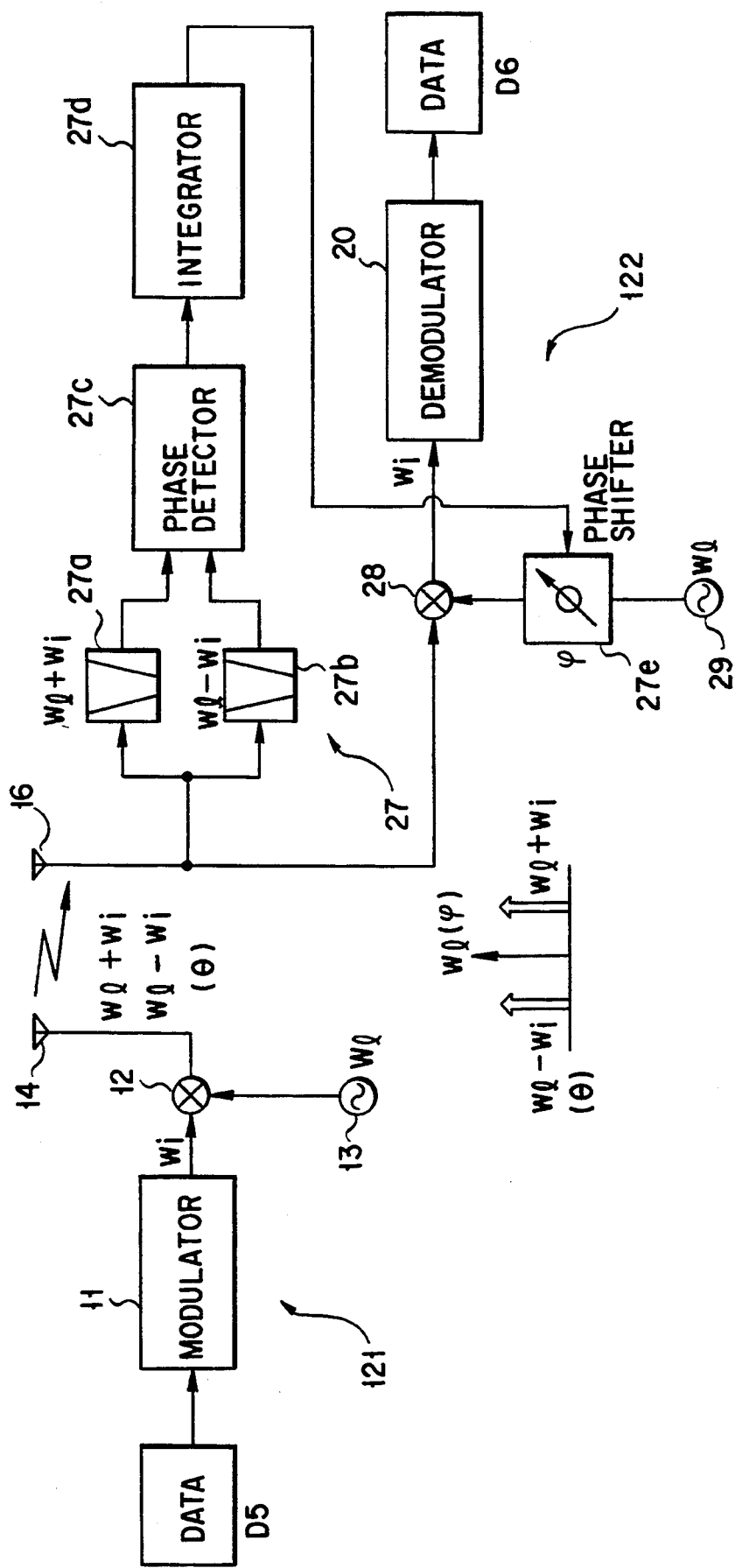

Reference will now be made in detail to the presently preferred embodiment of the invention as illustrated in the accompanying drawings, in which like reference characters designate like or corresponding parts throughout the several drawings.

First, the basic structure of a multi-frequency communication system according to the invention will be described. The communication system comprises a transmitting section and a receiving section. The transmitting section has a modulation section, a mixer, a local oscillator, and a transmitting antenna. The receiving section has a receiving antenna, a diversity section, a mixer, a local oscillator, and a demodulation section. In the transmitting section, the modulation section modulates data, superposing the data on a carrier, the mixer generates carriers of different frequencies from the carrier output by the modulation section and the oscillation frequencies output by the local oscillator, and the antenna radiate the carriers output by the mixer, into the air. In the receiving section, the antenna receives the carriers transmitted from the transmitting section, the diversity section and the mixer reproduce the original carrier with diversity, from the carriers of different frequencies received and the oscillation frequencies output by the local oscillator, and the demodulation section demodulates the carrier reproduced by the mixer, thereby outputting the data.

Since the transmitting section has a mixer and a local oscillator which serve to produce carriers of different frequencies, and since the receiving section also has a mixer and a local oscillator which cooperate to reproduce the original carrier with diversity, it suffices to provide only one transmitting section in the transmitting station and only one transmitting section in the receiving station. Further, since the same data is transmitted, superposed on a plurality of carriers having different frequencies, the system of this invention can achieve radio communication with diversity which is well protected from interference waves and fading.

FIG. 1 is a block diagram showing the basic structure of a communication system according to the present invention, which has a transmitting section 21 and a receiving section 22 and in which data is superposed on two carriers of different frequencies in the transmitting section 21. FIG. 2 represents the frequency spectrum of the electromagnetic waves generated in the transmitting section 21, and FIG. 3 illustrates the frequency spectrum of the electromagnetic waves reproduced in the receiving section 22.

As can be understood from FIG. 1, the transmitting section 21 comprises a modulation section 11, a mixer 12, a local oscillator 13, and a transmitting antenna 14. The modulation section 11 has a carrier oscillator (not shown). The receiving section 22 comprises a receiving antenna 16, a diversity section 17, a mixer 18, a local oscillator 19, and a demodulation section 20. The diversity section 17 functions as an amplifier for comparing input waves and selecting one of these waves or synthesizing these waves.

In the transmitting section 21, the modulation section 11 modulates input data 3 into a first carrier and amplifies a modulated output, thereby generating an output $f_m$. Meanwhile, the local oscillator 13 generates an output $f_{LO}$, which is supplied to the mixer 12. The output $f_m$ is supplied to the mixer 12. As can be understood from FIG. 2, the mixer 12 produces an upper side band wave having a frequency $f_{LO}+f_m$ and a lower side band wave having a frequency $f_{LO}-f_m$, from the output $f_m$ of the modulation section 11 and the output $f_{LO}$ of the local oscillator 13. These waves, which are electromagnetic waves, are radiated from the antenna 14 into the air.

In the receiving section 22, the receiving antenna 16 receives the electromagnetic waves transmitted from the transmitting section 21. The diversity section 17 amplifies these waves and selects one wave having higher quality than the other or synthesizes these waves into one wave. The one wave is input to the mixer 18. Meanwhile, the local oscillator 19 generates an output $f_{LO}$, which is supplied to the mixer 18. As can be understood from FIG. 3, the mixer 18 reproduces the output having frequency $f_m$ from the one wave having frequency $f_{LO}-f_m$ or $f_{LO}+f_m$ and the output $f_{LO}$ of the local oscillator 19. The output $f_m$, thus reproduced, is supplied to the demodulation section 20. The demodulation section 20 demodulates the output $f_m$, thereby producing data D4. The data D4 is output to a device located outside the receiving section 22.

As has been described, the mixer 12 and the local oscillator 13, both incorporated in the transmitting section 21, serve to generate two carriers of different frequencies, and the mixer 18 and the local oscillator 19, both used in the receiving section 22, cooperate to reproduce the original carrier.

Hence, the transmitting station need not have an antenna combining equipment or additional transmitting sections, nor does the receiving station need to have additional receiving sections. Provided with an improved diversity scheme, the communication system of this invention can yet accomplish radio communication well protected from interference waves and fading.

It should be noted that the transmitting section 21 transmits other upper side band waves and lower side band waves which have frequencies different from $f_{LO}+f_m$ and $f_{LO}-f_m$. Nonetheless, these upper side band and lower side band waves are removed by the diversity section 17 which is incorporated in the receiving section 22 and which selects the wave having the highest quality of all input waves.

The communication system of FIG. 1 will now be described in more detail, with reference to FIG. 4A.

As is evident from FIG. 4A, the modulation section 11 comprises a BPSK modulator which has an oscillator 11a and a mixer 11b. The oscillator 11a generates a carrier of 10.7 MHz, which is supplied to the mixer 11b. The data D3 is supplied to the mixer 11b. The mixer 11b mixes the carrier and the data D3, generating an output $f_m$ having frequency of 10.7 MHz. The output $f_m$ is supplied to the mixer 12. The local oscillator 13 generates an output $f_{LO}$ of 300 MHz, which is supplied to the mixer 12. The mixer 12 mixes the output $f_m$ of the modulation section 11 and the output $f_{LO}$ of the local oscillator 13, thus generating an output. The output of the mixer 12 is supplied, when necessary, to a band-bass filter 12a via a power amplifier (not shown).

The band-pass filter 12a has such a band characteristic that it can pass the upper side band wave having frequency $f_{LO}+f_m$ (=310.7 MHz), and the lower side band wave having frequency $f_{LO}-f_m$ (=289.3 MHz). Hence, the transmitting antenna 14 radiates, into the air, electromagnetic waves including the upper side band wave having frequency $f_{LO}+f_m$ and the lower side wave having frequency $f_{LO}-f_m$. The electromagnetic waves travel from the antenna 14 through the air.

As is clearly seen from FIG. 4A, the diversity section 17 comprises two band-pass filters 17a and 17b, two amplifiers 17c and 17d, a changeover switch 17e, and a comparator 17f, and the demodulation section 20 comprises a band-pass filter 20a, a mixer 20b, a local oscillator 20c, a band-pass filter 20d, and a demodulator 20e.

In the receiving section 22, the receiving antenna 16 receives the electromagnetic waves transmitted from the transmitting station 21 and including two waves having frequencies $f_{LO}+f_m$ and $f_{LO}-f_m$, respectively. The electromagnetic waves are input to both band-pass filters 17a and 17b of the diversity section 17. The band-pass filter 17a has such a band-characteristic that it passes only the wave having frequency $f_{LO}+f_m$ (=310.7 MHz). The band-pass filter 17b has such a band-characteristic that it passes only the wave having frequency $f_{LO}-f_m$ (=289.3 MHz). Two output signals of these band-pass filters 17a and 17b, which have frequencies $f_{LO}+f_m$ and $f_{LO}-f_m$, are supplied to the amplifiers 17c and 17d, respectively. The amplifiers 17c and 17d amplify the two input signals. Both amplified signals are supplied to the fixed contacts 17e1 and 17e2 of the changeover switch 17e, respectively, and also to the two inputs of the comparator 17f. The comparator 17f compares the two input signals and outputs a control signal to the changeover switch 17e. The control signal controls the switch 17e such that the movable contact 17e3 thereof contacts the fixed contact 17e1 or 17e2, thereby selecting one of the signals having frequencies $f_{LO}+f_m$ and $f_{LO}-f_m$, which has the higher quality, for example, the greater magnitude. In other words, the changeover switch 17e and the comparator 17f cooperate, selecting one of the two signals having $f_{LO}+f_m$ and $f_{LO}-f_m$, which has the better quality.

The signal output from the changeover switch 17e, which has $f_{LO}+f_m$ or $f_{LO}-f_m$ and is superior in quality to the other signal input to the switch 17e, is supplied to the mixer 18. In the meantime, the local oscillator 19 generates a signal $f_{LO1}$ having frequency of 300 MHz, which is supplied to the mixer 18. The mixer 18 mixes the output signal of the changeover switch 17e and the output signal $f_{LO1}$ of the local oscillator 19, thereby generating a signal. The signal generated by the mixer 18 is input to the band-pass filter 20a. The band-pass filter 20a has such a band-characteristic that it passes only a first intermediate-frequency signal $f_{m1}$ which corresponds to the output $f_m$ (=10.7 MHz) of the modulation section 11 of the transmitting section 21.

The first intermediate-frequency signal $f_{m1}$, i.e., the output signal of the band-pass filter 20a, is input to the mixer 20b. Meanwhile, the local oscillator 20c outputs a signal $f_{LO2}$ having frequency of 10.245 MHz, which is supplied to the mixer 20b. The mixer 20b mixes the output signal $f_{m1}$ of the band-pass filter 20a and the output signal $f_{LO2}$ of the local oscillator 20c, thus producing a signal. The signal produced by the mixer 20b is input to the band-pass filter 20d. The filter 20d has such a band-characteristic that it can pass a second intermediate-frequency signal $f_{m2}$ having frequency of 455 KHz.

The second intermediate-frequency signal $f_{m2}$ output by the band-pass filter 20d is supplied to the demodulator 20e. The demodulator 20e demodulates the second intermediate-frequency signal $f_{m2}$, thereby producing data D4 which is identical to the data D3 which is modulated by the modulation section 11 (i.e., the BPSK modulator).

As has been described, the present invention can provide a multi-frequency communication system with an improved diversity scheme, which has a simple structure.

The signals generated by the various local oscillators incorporated in the system of FIG. 4A, and the signals output by the various band-pass filters used in the system can have frequencies other than those specified above. Their frequencies can be in a broad range, in the order of MHz to GHz.

A modification of the communication system of FIG. 4A will now be described with reference to FIG. 4B.

In FIG. 4B, the modulator 11 generates an output $W_l$ which includes the carrier and the data D5, in the transmitting section 121. The local oscillator 13 generates an output $W_i$. The mixer 12 mixes the output $W_l$ from the modulator 11 and the output $W_l$ from the local oscillator 13. The transmitting antenna 14 radiates, into the air, electromagnetic waves including the upper side band wave $W_l+W_i$ and the lower side band wave $W_l-W_i(\theta)$.

As is evident from FIG. 4B, the diversity section 27 takes a construction of phase adjusting/synthesizing for the two waves.

The waves are output from the mixer 28 through the receiving antenna 16 in the receiving section 122, as follows (1) and (2):

From the wave $(W_l+W_i)$,
$$\cos(W_l+W_i)t\cdot\cos(W_it+\psi)\rightarrow\cos(W_lt-\psi) \quad (1)$$

And from the wave $(W_l-W_i)$,
$$\cos(W_it+\psi)\cdot\cos\{(W_l-W_i)t+\theta\}\rightarrow\cos(W_lt+\psi-\theta) \quad (2)$$

where $\psi$: an amount of the phase shift in the phase shifter 27e, and $\theta$: a phase difference between the two waves $W_l+W_i$ and $W_l-W_i$.

The phase difference $\theta$ is detected in the phase detector 27C according to two outputs from the band-pass filters 27a and 27b through the receiving antenna 16, and supplied to the phase shifter 27e through the integrator 27d. The phase shifter 27e adjusts the phase $\psi$ of the output $W_l$ from the local oscillator 29 in the receiving section 122 into $\theta/2$, based on the following relation (3).

$$-\psi=+\psi-\theta\rightarrow 2\psi=\theta\rightarrow\psi=\theta/2 \quad (3)$$

This relation (3) is obtained by comparing the above relations (1) and (2).

As can be understood from the above, since the two waves $W_l+W_i$ and $W_l-W_i$ are synthesized in phase state, the quality of the demodulated data D6 from the demodulator 20 as shown in FIG. 4B is maintained high as well as FIG. 4A.

Another modification of the communication system of FIG. 4A now be described with reference to FIG. 4C.

In FIG. 4C, the modulator 11 generates a phase modulated wave output of the data $\cos\{2\pi f_it+\phi(t)\}$, when the data D7 is represented $\phi(t)$, and the carrier frequency is represented $f_i$, in the transmitting section 221.

The transmitted waves from the transmitting antenna 14 through the mixer 12 which mixes the phase modulated wave output from the modulator 11 and the output $f_l$ from the local oscillator 13, are represented as follows:

$$\cos\{2\pi f_it+\phi(t)\}\cdot\cos 2\pi f_lt=\tfrac{1}{2}[\cos\{2\pi(f_l+f_i)t+\phi(t)\}+\cos\{2\pi(f_l-f_i)t-\phi(t)\}] \quad (4)$$

This relation (4) represents that two waves are transmitted from the transmitting antenna 14.

As is evident from FIG. 4C, the diversity section 37 takes a construction of phase adjusting/synthesizing for the two waves. The waves are output from the phase modulator 37a through the receiving antenna 16 in the receiving section 222, by phase-modulating with the phase amount $\theta_s$ of the output $f_s$ from the local oscillator 37c, as follows (5) and (6):

From the wave $f_l+f_i$, $\cos\{2\pi(f_l+f_i)t+\phi(\text{A}\sin(2\pi f_st+\theta_s)\}$ (5)

And from the wave $f_l-f_i$, $\cos\{2\pi(f_l-f_i)t-\phi(t)+\theta+A\sin(2\pi f_st+\theta_s)\}$ (6)

where $\theta$: relative phase difference between the two waves $f_l+f_i$ and $f_l-f_i$, in the air, and A: magnitude of the output $f_s$.

The mixer 18 mixes the two waves and the output $f_l$ from the local oscillator 19 in the receiving section 222, which has a phase amount $\theta_l$, and outputs waves, as follows (7) and (8):

From the wave $f_l+f_i$, $\cos\{2\pi f_it+\phi(t)+A\sin(2\pi f_st+\theta_s-\theta_l)\}$ (7)

And from the $f_l-f_i$, $\cos\{2\pi f_it+\phi(t)-\theta-A\sin(2\pi f_st+\theta_s)+\theta_l\}$ (8)

In relatively, the relations (7) and (8) may be modified, as follows (9) and (10):

From the wave $f_l+f_i$,
$\cos\{2\pi f_it+\phi(t)+A\sin(2\pi f_st+\theta_s)\}$ (9)

And from the wave $f_l-f_i$,
$\cos\{2\pi f_it+\phi(t)-\theta+2\theta_l-A\sin(2\pi f_st+\theta_s)\}$
$=\cos\{2\pi f_it+\phi(t)+B-A\sin(2\pi f_st+\theta_s)\}$ (10)

where $B=-\theta+2\theta_l$.

Figure 4D:
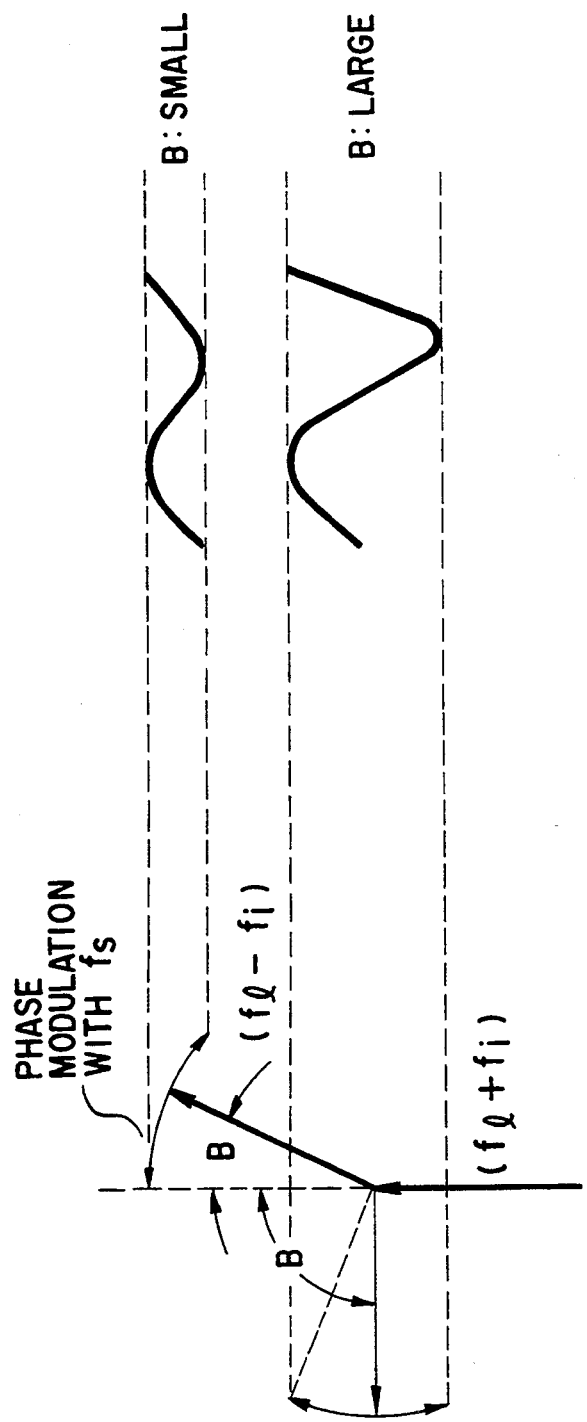
FIG. 4D is a diagram representing the vector relationship of the system of FIG. 4C.
Figure 5:
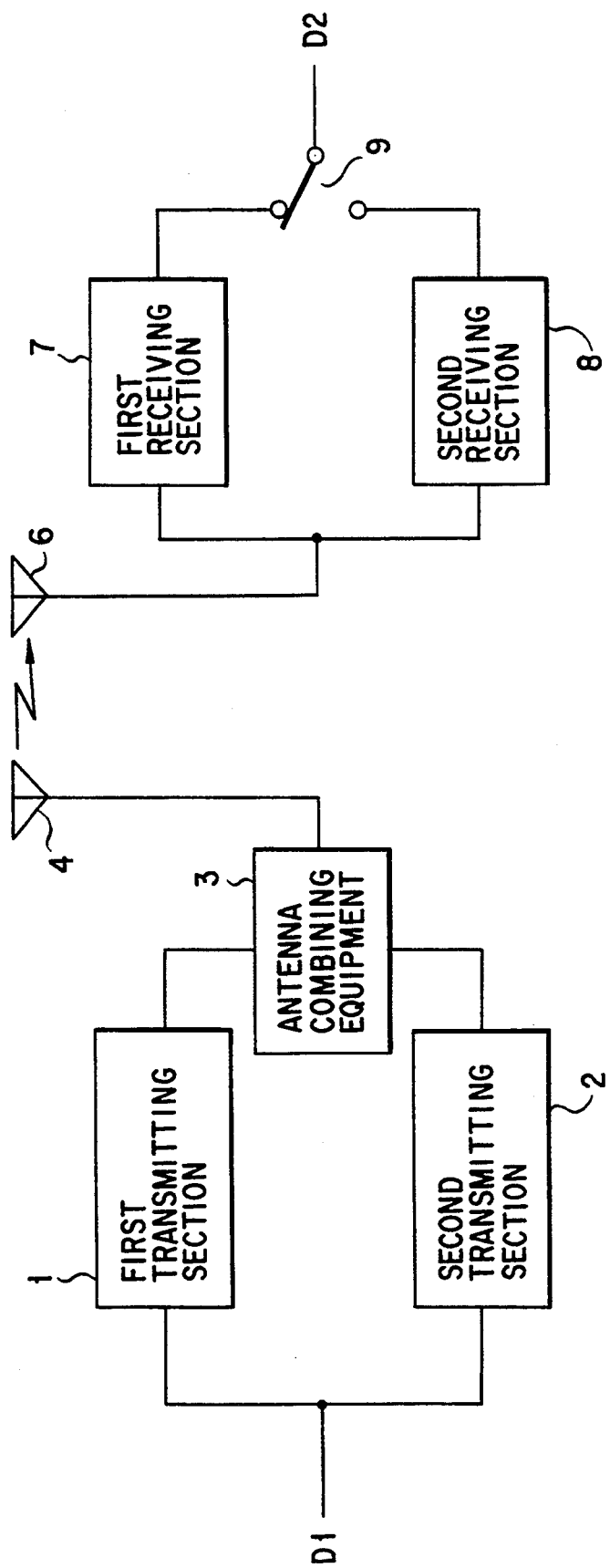
FIG. 5 is a block diagram showing a communication system with a conventional diversity scheme.

FIG. 4D shows the vector relationship between the two waves $f_l+f_i$ and $f_l-f_i$ represented by relations (9) and (10), when a reference is the wave $(f_l+f_i)$.

That is to say, when the phase difference $(B=-\theta+2\theta_l)$ between the two waves $f_l+f_i$ and $f_l-f_i$ is small, the variation of the magnitude with the output $f_s$ is small. When the phase difference B is large, the magnitude variation is also large. Therefore, the output $f_i$ including the two waves (9) and (10) from the mixer 18 is detected by the envelope detector 37d, then the phase amount $\theta_l$ of the output $f_l$ is adjusted by the phase shifter 38g with the detected output from the envelope detector 37d, so as to reduce the magnitude variation. The magnitude variation becomes minimum, when $\theta_l$ is equal to $\theta/2$. Actually, the polarity of the phase variation can be detected as the polarity of the DC component, by mixing the detected output from the envelope detector 37d and the output $f_s$ from the local oscillator 37c through the phase shifter 37b which provides the phase amount $\theta_s$ in the mixer 37e and, by integrating the output from the mixer 37e in the integrator 37f. The output from the integrator 37f is supplied to the phase shifter 37g in order to adjust the phase amount $\theta_l$ of the output $f_l$.

This is an operation, when the wave $f_l+f_i$ does not vary. In fact, the wave $f_l+f_i$ as the reference is also phase-modulated by the output $f_s$ in the opposition direction that of the wave $f_l-f_i$, as is evident from the relations (9) and (10). Therefore, when the wave $f_l+f_i$ is varied, the magnitude variation is larger than that of the wave $f_l-f_i$, then accuracy of the phase adjustment $(\theta_l)$ for the output $f_l$ is higher.

As can be understood from the above, since the two waves $f_l+f_i$ and $f_l-f_i$ are synthesized in phase state, the quality of the demodulated data D8 from the demodulator 20 as shown in FIG. 4C is maintained high as well as FIG. 4A and FIG. 4B.

As can be understood from the above, the multi-frequency communication system according to the invention need not have a plurality of transmitting sections or a plurality of receiving sections, and its transmitting station and its receiving station can therefore be made compact. In addition, the multi-frequency communication system has an improved diversity scheme, and can accomplish radio communication well protected from interference waves and fading.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A multi-frequency communication system comprising:
   a transmitting section including:
      modulation means including an oscillator for generating a first carrier and a mixer, for modulating the first carrier with data to be transmitted, thereby to generate a modulated output;
      first local oscillation means for generating a first local oscillating signal which is to be used as a second carrier;
      first mixer means for mixing the modulated output from said modulation means and the first local oscillating signal generated by said first local oscillation means, thereby to generate waves of different frequencies, including at least an upper side band wave having a frequency which is a sum of the frequencies of the modulated output and the first local oscillating signal and a lower side band wave having a frequency which is a difference between the frequencies of the modulated output and the first local oscillating signal; and
      transmitting antenna means for radiating electromagnetic waves into the air, the electromagnetic waves including the waves of different frequencies generated by said first mixer means; and a receiving section including:
      receiving antenna means for receiving the electromagnetic waves including the waves of different frequencies and radiated from said transmitting antenna means;
      diversity means for extracting at least one wave of the upper side band wave and the lower side band wave from the waves of different frequencies received by said receiving antenna means;
      second local oscillation means for generating a second local oscillating signal equal to the first local oscillating signal;
      second mixer means for mixing the at least one wave extracted by said diversity means and the second local oscillating signal generated by said second local oscillation means, thereby to generate an output; and
      demodulation means for demodulating the output generated by said second mixer means, thereby to recover the data to be transmitted by the transmitting section.

2. The multi-frequency communication system according to claim 1, wherein said modulation means further includes a BPSK modulator.

3. The multi-frequency communication system according to claim 1, wherein said transmitting section includes a band-pass filter for passing the upper side band wave and the lower side band wave included in the waves of different frequencies which have been generated by said first mixer means, said band-pass filter being located between the first mixer means and said transmitting antenna means.

4. The multi-frequency communication system according to claim 3, wherein said first carrier has frequency of 10.7 MHz, said second carrier has frequency of 300 MHz, and said band-pass filter allows the passage of waves having frequencies ranging from 289.3 MHz to 310.7 MHz.

5. The multi-frequency communication system according to claim 1, wherein said diversity means includes means for distributing the electromagnetic waves received by said receiving antenna means, into a first set of waves and a second set of waves, a first band-pass filter for allowing the passage of the upper side band wave included in the first set of waves, a second band-pass filter for allowing the passage of the lower side band wave included in the second set of waves, and means for comparing the upper side band wave and the lower side band wave from said first and second band-pass filters and outputting one of said waves compared, which has the better quality.

6. The multi-frequency communication system according to claim 5, wherein said first carrier has frequency of 10.7 MHz, said second carrier has frequency of 300 MHz, said first band-pass filter allows the passage of a wave having frequency of 310.7 MHz, and said second band-pass filter allows the passage of a wave having frequency of 289.3 MHz.

7. The multi-frequency communication system according to claim 1, wherein said demodulation means includes means for converting a first intermediate-frequency signal according to the output from said second mixer means, to a second intermediate-frequency signal having a frequency lower than that of the first intermediate-frequency signal.

8. The multi-frequency communication system according to claim 7, wherein said demodulation means includes a first band-pass filter for allowing the passage of the first intermediate-frequency signal, and a second band-pass filter for allowing the passage of the second intermediate-frequency signal.

9. The multi-frequency communication system according to claim 8, wherein said first carrier has frequency of 10.7 MHz, said first band-pass filter allows the passage of a wave having frequency of 10.7 MHz, and said second band-pass filter allows the passage of a wave having frequency of 455 KHz.

10. A multi-frequency communication system comprising:
    a transmitting section including:
       modulation means including an oscillator for generating a first carrier and a mixer, for modulating the first carrier with data to be transmitted, thereby to generate a modulated output;
       first local oscillation means for generating a first local oscillating signal which is to be used as a second carrier;
       first mixer means for mixing the modulated output from said modulation means and the first local oscillating signal generated by said first local oscillation means, thereby to generate waves of different frequencies, including at least an upper side band wave having a frequency which is a sum of the frequencies of the modulated output and the first local oscillating signal and a lower side band wave having a frequency which is a difference between the frequencies of the modulated output and the first local oscillating signal; and transmitting antenna means for radiating electromagnetic waves into the air, the electromagnetic waves including the waves of different frequencies generated by said first mixer means; and a receiving section including:

receiving antenna means for receiving the electromagnetic waves including the waves of different frequencies and radiated from said transmitting antenna means;

diversity means for synthesizing the upper side band wave and the lower side band wave, in phase-state, from the waves of different frequencies received by said receiving antenna means, thereby to generate an output; and demodulation means for demodulating the output generated by said diversity means, thereby to recover the data to be transmitted by the transmitting section.

11. The multi-frequency communication system according to claim 10, wherein said diversity means includes means for distributing the electromagnetic waves received by said receiving antenna means, into a first set of waves and a second set of waves, a first band-pass filter for allowing the passage of the upper side band wave included in the first set of waves, a second band-pass filter for allowing the passage of the lower side band wave included in the second set of waves, means for detecting a phase difference between the upper side band wave from the first band-pass filter and the lower side band wave from the second band-pass filter, means for integrating an output from the detecting means, second local oscillator means for generating a second local oscillating signal equal to the first local oscillating signal, phase shifter means for adjusting a phase amount $\Psi$ of the second local oscillating signal from the second local oscillator means in accordance with an output from the integrating means, and second mixer means for mixing the electromagnetic waves received by said receiving antenna means and an output from the phase shifter means, wherein the phase shifter means adjusts into $\Psi = \theta/2$.

12. The multi-frequency communication system according to claim 10, wherein said diversity means comprises:

oscillator means for oscillating a predetermined frequent signal;

first phase shifter means for adjusting a phase amount $\theta_s$ of the predetermined frequency signal from the oscillator means;

phase modulator means for modulating a phase of the electromagnetic waves received by said receiving antenna means in accordance with an output from the first phase shifter means;

local oscillator means for oscillating a local oscillating signal which corresponds to the second carrier;

second phase shifter means for adjusting a phase amount $\theta_l$ of the local oscillating signal from the local oscillator means;

second mixer means for mixing an output from the phase modulator means and an output from the second phase shifter means;

envelope detection means for detecting the envelope of an output from the second mixer means;

third mixer means for mixing an output from the envelope detection means and the output from the first phase shifter means; and integrator means for integrating an output from the third mixer means;

wherein the second phase shifter means adjusts the phase amount $\theta_l$ in accordance with an output from the integrator means.

13. A method for performing multi-frequency communication, comprising the steps of:

modulating a first carrier generated by an oscillator with data to be transmitted in a mixer, thereby to generate a modulated output;

first generating a first local oscillating signal which is to be used as a second carrier;

first mixing the modulated output and the first local oscillating signal, thereby to generate waves of different frequencies, including at least an upper side band wave having a frequency which is a sum of the frequencies of the modulated output and the first local oscillating signal and a lower side band wave having a frequency which is a difference between the frequencies of the modulated output and the first local oscillating signal;

radiating electromagnetic waves into the air, the electromagnetic waves including the waves of different frequencies;

receiving the electromagnetic waves including the waves of different frequencies;

extracting at least one wave of the upper side band wave and the lower side band wave from the waves of different frequencies received by said receiving step;

second generating a second local oscillating signal equal to the first local oscillating signal;

second mixing the at least one wave extracted by said extracting step and the second local oscillating signal generated, thereby to generate an output; and demodulating the output generated by said second mixing step, thereby to recover the data to be transmitted.

14. A method for performing multi-frequency communication, comprising the steps of:

modulating a first carrier generated by an oscillator with data to be transmitted in a mixer, thereby to generate a modulated output;

generating a local oscillating signal which is to be used as a second carrier;

mixing the modulated output and the local oscillating signal, thereby to generate waves of different frequencies, including at least an upper side band wave having a frequency which is a sum of the frequencies of the modulated output and the local oscillating signal and a lower side band wave having a frequency which is a difference between the frequencies of the modulated output and the local oscillating signal;

radiating electromagnetic waves into the air, the electromagnetic waves including the waves of different frequencies;

receiving the electromagnetic waves including the waves of different frequencies;

synthesizing the upper side band wave and the lower side band wave, in phase state, from the waves of different frequencies received by said receiving step, thereby to generate an output; and demodulating the output generated by said synthesizing step, thereby to recover the data to be transmitted.

* * * * *